US010153710B1

(12) United States Patent
Barbosa et al.

(10) Patent No.: US 10,153,710 B1
(45) Date of Patent: Dec. 11, 2018

(54) POWER SUPPLY AND CONTROL METHOD THEREOF

(71) Applicant: DELTA ELECTRONICS, INC., Taoyuan (TW)

(72) Inventors: Peter Mantovanelli Barbosa, Taoyuan (TW); Laszlo Huber, Cary, NC (US); Brian T. Irving, Hillsborough, NC (US)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/658,894

(22) Filed: Jul. 25, 2017

(51) Int. Cl.
*H02M 7/15* (2006.01)
*H02M 7/04* (2006.01)

(52) U.S. Cl.
CPC ..................... *H02M 7/04* (2013.01)

(58) Field of Classification Search
CPC ........ H02M 7/17; H02M 7/19; H02M 7/1552; H02M 7/1623; H02M 433/1584; H02M 1/4216; H02M 7/2173; Y02B 70/126; H02J 3/26
USPC ............. 363/65, 67, 68, 69, 70, 86, 87, 129; 307/43, 58, 71, 82, 130
See application file for complete search history.

(56) References Cited

U.S. PATENT DOCUMENTS 8,553,440 B1 * 10/2013 Nanut ..................... H02M 1/12
363/129
9,847,708 B2 * 12/2017 Han .................... H02M 1/4216

2002/0080632 A1 * 6/2002 Haga ................... H02M 1/4216
363/65
2004/0036452 A1 2/2004 Brooks et al.
2010/0124083 A1 5/2010 Tinsley, III et al.
(Continued)

FOREIGN PATENT DOCUMENTS

AU 2015203405 1/2017
CN 106257816 12/2016
(Continued)

OTHER PUBLICATIONS

Girod, R., & Weida, D. High Efficient True 3-Phase Compact Switch-Mode Rectifier Module for Telecom Power Solutions. IEEE INTELEC. (2013) ISBN 978-3-8007-3500-6, 658-663.
(Continued)

*Primary Examiner* — Alex Torres-Rivera
(74) *Attorney, Agent, or Firm* — Hauptman Ham, LLP

(57) ABSTRACT

A power supply includes multiple power modules and a control circuit. Input terminals of the power modules are connected in star connection such that each power module receives a phase input voltage. Output terminals of the power modules are connected in parallel. Each power modules includes a first and a second converter. The first converter converts the phase input voltage into an intermediate bus voltage. The second converter outputs a DC supply voltage according to the intermediate bus voltage. The control circuit is coupled to the power modules and configured to output first and second driving signals to control the first and second converters in the power modules. A bus voltage average value is calculated by the control circuit according to the intermediate bus voltages of the power modules, and the first and the second driving signals for the power modules are generated according to the bus voltage average value.

13 Claims, 6 Drawing Sheets

(56) References Cited

U.S. PATENT DOCUMENTS

| | | | |
|---|---|---|---|
| 2011/0001359 A1* | 1/2011 | Moon | H02J 1/102 |
| | | | 307/43 |
| 2011/0025246 A1* | 2/2011 | Sakakibara | H02M 1/4216 |
| | | | 318/400.42 |
| 2014/0198542 A1* | 7/2014 | Swamy | H02M 1/4225 |
| | | | 363/37 |
| 2016/0079881 A1* | 3/2016 | Barbosa | H02M 7/49 |
| | | | 307/11 |
| 2017/0366082 A1* | 12/2017 | Liu | H02P 7/04 |

FOREIGN PATENT DOCUMENTS

| | | |
|---|---|---|
| EP | 2 999 109 | 3/2016 |
| TW | 395627 | 6/2000 |
| WO | WO 2015/076776 | 5/2015 |

OTHER PUBLICATIONS

Huber, L, Kumar, M., Jovanovic, M., Ping, D., & Liu, G. Analysis, Design, and Evaluation of Three-Phase Three-Wire Isolated AC-DC Converter Implemented with Three Single-Phase Converter Modules. IEEE APEC, (2016), 38-45.

\* cited by examiner

POWER SUPPLY AND CONTROL METHOD THEREOF

BACKGROUND

Technical Field

The present disclosure relates to a power supply, and in particular, to a power supply used in a three-phase system.

Description of Related Art

A three-phase power device may be implemented from single-phase modules. However, when an artificial floating neutral point is created by using a star configuration in the implementation of the three-phase power device, the instability of the artificial neutral point voltage may cause the three-phase AC power transmission at the grid-side unbalance.

Therefore, an important area of research in the field involves ways in which to control the voltage of the artificial floating neutral point against the actual power grid neutral point.

SUMMARY

One aspect of the present disclosure is a power supply. The power supply includes a plurality of power modules and a control circuit. Input terminals of the power modules are electrically connected in star connection such that each power module receives a corresponding phase input voltage. Output terminals of the plurality of power modules are electrically connected in parallel, in which each power modules includes a first and a second converter. The first converter is configured to convert the corresponding phase input voltage into an intermediate bus voltage. The second converter is configured to output a DC supply voltage according to the intermediate bus voltage. The control circuit is electrically coupled to the power modules and configured to output first driving signals to control the first converters in the power modules, and configured to output second driving signals to control the second converters in the power modules. A bus voltage average value is calculated by the control circuit according to the intermediate bus voltages of the power modules, and the first driving signals and the second driving signals for the power modules are generated according to the bus voltage average value.

Another aspect of the present disclosure is a power supply. The power supply includes a plurality of power modules and a control circuits. Input terminals of the power modules are electrically connected in star connection such that each power module receives a corresponding phase input voltage. Output terminals of the power modules are electrically connected in parallel. Each of the power modules includes a plurality of power supply units. Input terminals of the power supply units in the same power module are electrically coupled in series, and output terminals of the power supply units in the same power module are electrically coupled in parallel. Each of the power supply units includes a first and a second converter. The first converter is configured to convert the corresponding phase input voltage into an intermediate bus voltage. The second converter is configured to output a DC supply voltage according to the intermediate bus voltage. The control circuit is electrically coupled to the power supply units and configured to output a plurality of first driving signals to control the first converters in the power supply units. A bus voltage average value is calculated by the control circuit according to the intermediate bus voltages of the power supply units, and the first driving signals for the power supply units are generated according to the bus voltage average value.

Yet another aspect of the present disclosure is a power supply control method. The power supply control method includes detecting a plurality of intermediate bus voltages of a plurality of power modules of a power supply respectively; calculating, by a control circuit of the power supply, a bus voltage average value according to the intermediate bus voltages of the power modules; outputting, by the control circuit, a plurality of first driving signals according to the bus voltage average value to respectively control a plurality of first converters in the power modules; and outputting, by the control circuit, a plurality of second driving signals according to the bus voltage average value to respectively control a plurality of second converters in the power modules.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
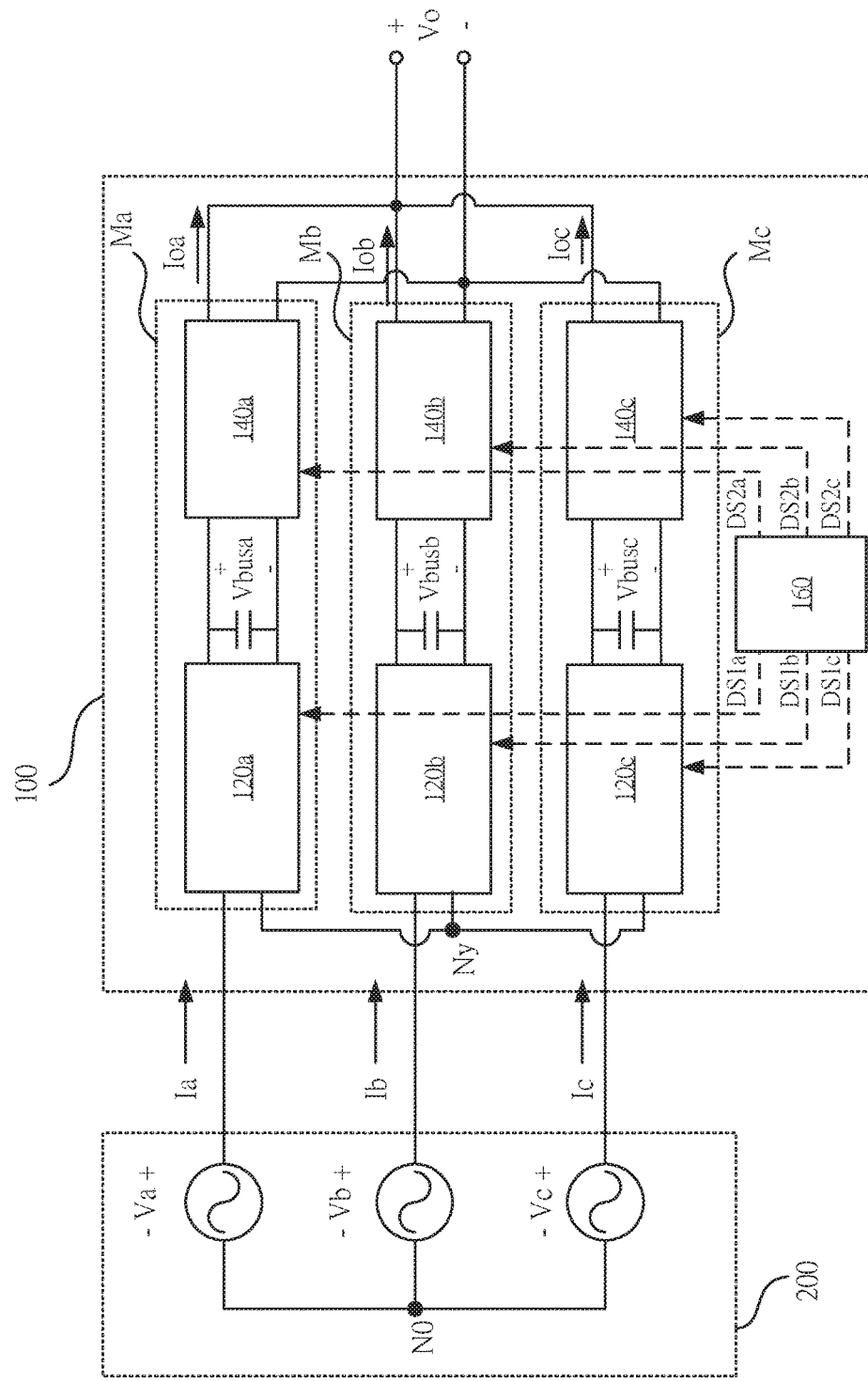
FIG. 1 is a diagram illustrating a power supply according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

The terms "about" and "approximately" in the disclosure are used as equivalents. Any numerals used in this disclosure with or without "about," "approximately," etc. are meant to cover any normal fluctuations appreciated by one of ordinary skill in the relevant art. In certain embodiments, the term "approximately" or "about" refers to a range of values that fall within 20%, 10%, 5%, or less in either direction (greater or less than) of the stated reference value unless otherwise stated or otherwise evident from the context.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a diagram illustrating a power supply 100 according to some embodiments of the present disclosure. As shown in FIG. 1, the power supply 100 is used in a three-phase power system, and configured to receive a three-phase input power, and correspondingly output a DC supply voltage Vo.

Specifically, the power supply 100 includes three single-phase power modules Ma, Mb, and Mc and a control circuit 160. Input terminals of the power modules Ma, Mb, and Mc are electrically connected in star connection such that each of the power modules Ma, Mb, and Mc is configured to receive a corresponding phase input voltage Va, Vb, or Vc and a corresponding phase input current Ia, Ib, or Ic. Output terminals of the power modules Ma, Mb, and Mc are electrically connected in parallel.

As shown in the drawing, the star connection at the input side of the power modules Ma, Mb, and Mc creates the artificial neutral point Ny in the power supply 100 which needs to be balanced against the actual neutral point NO of the grid. By applying the configuration shown in FIG. 1, the single-phase power modules Ma, Mb, and Mc may now be used in the power supply 100 for three-phase configuration.

In some embodiments, each of the power modules Ma, Mb, and Mc respectively includes an AC-DC converter 120a, 120b, 120c and a DC-DC converter 140a, 140b, 140c. The AC-DC converters 120a, 120b, 120c are configured to convert the corresponding phase input voltage Va, Vb, Vc into the intermediate bus voltages Vbusa, Vbusb, Vbusc respectively. In some embodiments, the intermediate bus voltages Vbusa, Vbusb, Vbusc are the cross voltage of the DC bus capacitors arranged between the AC-DC converters 120a, 120b, 120c and the DC-DC converters 140a, 140b, 140c.

The DC-DC converters 140a, 140b, 140c are configured to output the DC supply voltage Vo according to the intermediate bus voltages Vbusa, Vbusb, Vbusc. As shown in the drawing, the power modules Ma, Mb, Mc output corresponding output currents Ioa, Iob, Ioc via the DC-DC converters 140a, 140b, 140c, in order to supply the load current required by the later circuit.

The control circuit 160 is electrically coupled to the power modules Ma, Mb, and Mc, and configured to output driving signals DS1a, DS1b, DS1c to control and drive the AC-DC converters 120a, 120b, 120c in the power modules Ma, Mb, and Mc respectively, and configured to output driving signals DS2a, DS2b, DS2c to control and drive the DC-DC converters 140a, 140b, 140c in the power modules Ma, Mb, and Mc respectively.

For better understanding of the present disclosure, the control method of the power supply 100 to control the voltage level of the artificial neutral point Ny by providing proper driving signals DS1a, DS1b, DS1c and driving signals DS2a, DS2b, DS2c will be discussed in accompanied with drawings in the following paragraphs.

Figure 2:
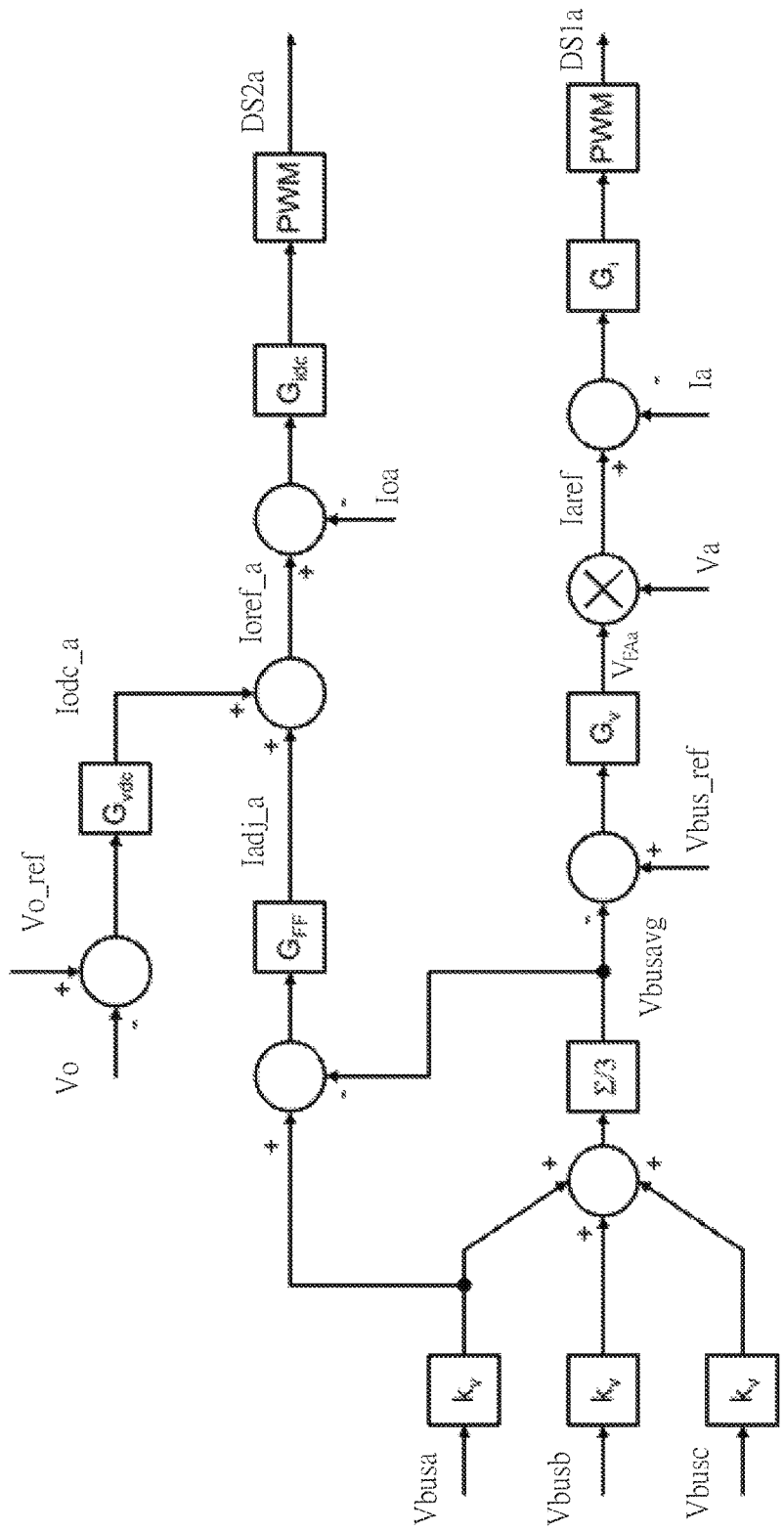
FIG. 2 is a control diagram illustrating the calculation process to obtain the driving signal and the driving signal according to some embodiments of the present disclosure.

Reference is made to FIG. 2. FIG. 2 is a control diagram illustrating the calculation process to obtain the driving signal DS1a and the driving signal DS2a according to some embodiments of the present disclosure.

As depicted in FIG. 2, a bus voltage average value Vbusavg is calculated by the control circuit 160 according to the intermediate bus voltages Vbusa, Vbusb, and Vbusc of the power modules Ma, Mb and Mc. Specifically, the intermediate bus voltages Vbusa, Vbusb, and Vbusc are multiplied by a bus voltage sensing gain Kv respectively, and then the mean value is calculated to obtain the bus voltage average value Vbusavg. In some embodiments, in the event that one of the input phases drops out, the bus average voltage calculation changes correspondingly. Instead of dividing the total sum by three, the sum of the intermediate bus voltages from the healthy phases is divided by two. Alternatively stated, in the event that an input phase (e.g., the phase corresponding to the power module Ma) drops out, the bus voltage average value Vbusavg is calculated by the control circuit 160 according to the intermediate bus voltages Vbusb and Vbusc, of the power modules corresponding to remaining input phases (e.g., the power modules Mb, Mc).

In some embodiments, the driving signals DS1a, DS1b, DS1c and the driving signals DS2a, DS2b, DS2c are generated according to the bus voltage average value Vbusavg.

For example, the driving signal DS1a for the corresponding power module Ma is generated according to the bus voltage average value Vbusavg, the phase input voltage Va of the power module Ma, a phase input current Ia of the power module Ma, and a bus voltage reference value Vbusref, in which the bus voltage reference value Vbusref denotes a target value for the intermediate bus voltage Vbusa. As shown in FIG. 2, the control circuit 160 is configured to calculate a difference between the bus voltage reference value Vbusref and the bus voltage average value Vbusavg.

Next, the control circuit 160 is configured to amplify the difference between the bus voltage reference value Vbusref and the bus voltage average value Vbusavg by an error amplifier gain Gv to obtain an error amplification signal $V_{EAa}$.

Next, the control circuit 160 is configured to calculate an input current reference value Iaref based on the error amplification signal $V_{EAa}$ and the phase input voltage Va accordingly. The input current reference value Iaref denotes a target value for the phase input current Ia.

Next, the control circuit 160 is configured to generate the driving signal DS1*a* according to a difference between the input current reference value Iaref and the phase input current Ia. Specifically, the control circuit 160 is configured to amplify the difference between the input current reference value Iaref and the actual phase input current Ia by a current gain Gi to obtain a current error amplification signal, and then the driving signal DS1*a* is generated with pulse width modulation (PWM) according to the current error amplification signal.

For the three-phase system, the voltage of the artificial neutral point Ny with respect to the voltage of the actual neutral point NO of the grid may be denoted by the following equation:

$$V_{y0} = \frac{Y_a V_{ao} + Y_b V_{bo} + Y_c V_{co}}{Y_a + Y_b + Y_c}$$

In the above equation, Ya, Yb, Yc respectively denote the input admittances of the power supply 100 for each phase. When the input admittances Ya, Yb, Yc for each phase are the same, the voltage of the artificial neutral point Ny is balanced, and the following equation is satisfied.

$$V_{y0} = \frac{V_{ao} + V_{bo} + V_{co}}{3}$$

Alternatively stated, in order to balance the voltage of the artificial neutral point Ny, the same input admittances Ya, Yb, Yc are presented for each phase. Since the input admittance is proportional to the error amplification signal, the control circuit 160 is configured to ensure the error amplification signals $V_{EAa}$, $V_{EAb}$, $V_{EAc}$ are the same.

Therefore, in the control method shown in FIG. 2, the error amplifier gain Gv for all power modules Ma, Mb, Mc, are the same in order to obtain the same error amplification signals $V_{EAa}$, $V_{EAb}$, $V_{EAc}$ for power modules Ma, Mb, Mc, in which the condition may be achieved by digital implementation. Thus, by applying the control method stated above, the intermediate bus voltages Vbusa, Vbusb, Vbusc are averaged before processing it through the error amplifiers for each phase, and the voltage of the artificial neutral point Ny may be properly controlled and balanced against the grid actual neutral point NO.

Although the average dc link voltage is controlled to a given reference, in order to further control each of the intermediate bus voltages Vbusa, Vbusb, Vbusc, a feed-forward control of the intermediate bus voltages Vbusa, Vbusb, Vbusc of the power modules Ma, Mb, Mc is applied.

Specifically, the control circuit 160 is configured to output the driving signals DS2*a*, DS2*b*, DS2*c* to control the operation of the DC-DC converter 140*a*, 140*b*, 140*c*, so as to keep the intermediate bus voltages Vbusa, Vbusb, Vbusc at proper level.

As mentioned above, the driving signals DS2*a*, DS2*b*, DS2*c* are also generated according to the bus voltage average value Vbusavg. For example, the driving signal DS2*a* for the corresponding power module Ma is generated according to the bus voltage average value Vbusavg, the DC supply voltage Vo, a DC supply voltage reference value Vo_ref, an output current Ioa of the power module Ma, and the intermediate voltage Vbusa of the power module Ma. As shown in FIG. 2, the control circuit 160 is configured to calculate a difference between the intermediate bus voltage Vbusa of the corresponding power module Ma and the bus voltage average value Vbusavg.

Next, the control circuit 160 is configured to amplify the difference by a feed-forward gain Gff in order to obtain a feed-forward current adjustment signal Iadj_a.

Next, the control circuit 160 is configured to accordingly sum up the feed-forward current adjustment signal Iadj_a and an output current reference value Iodc_a of the corresponding power module Ma to calculate an adjusted output current reference value Ioref_a.

Next, the control circuit 160 is configured to generate the driving signal DS2*a* according to a difference between the adjusted output current reference value Ioref_a and the output current Ioa of the power module Ma. Specifically, the control circuit 160 is configured to amplify the difference between the adjusted output current reference value Ioref_a and the output current Ioa by a current gain Gidc to obtain a current error amplification signal, and then the driving signal DS2*a* is generated with pulse width modulation (PWM) according to the current error amplification signal.

As shown in FIG. 2, in some embodiments, the control circuit 160 is configured to calculate the output current reference value Iodc_a base on a difference between the DC supply voltage reference value Vo_ref and the DC supply voltage Vo. The output current reference value Iodc_a is generated by multiplying the difference between the DC supply voltage reference value Vo_ref and the DC supply voltage Vo by an error amplifier gain Gvdc.

Since the feed-forward control of the intermediate bus voltage Vbusa is applied, the current reference for dc output current loop control of each module is adjusted, and the DC supply voltage Vo and the output current Ioa are respectively converge to the proper reference values. Accordingly, the intermediate bus voltage Vbusa of the corresponding power module Ma also converges to the average reference.

It is noted that although the calculation process of the driving signals DS1*a* and DS2*a* for driving the power module Ma is mainly discussed above, the calculation process for the driving signals DS1*b*, DS1*c* and DS2*b*, DS2*c* for driving the power modules Mb, Mc is similar thereto and thus further explanations are omitted herein for the sake of brevity.

Figure 3:
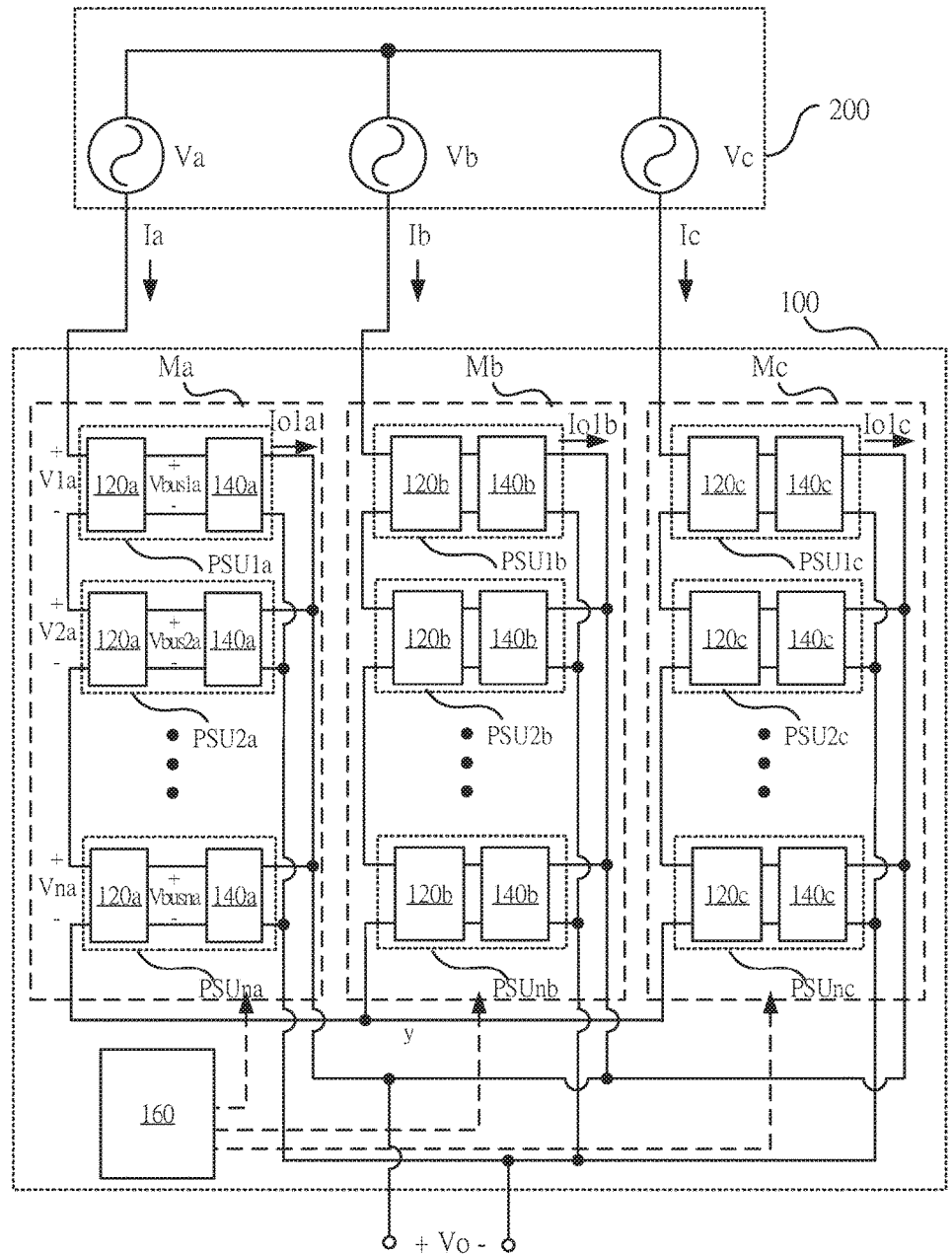
FIG. 3 is a diagram illustrating the power supply according to some other embodiments of the present disclosure.

Reference is made to FIG. 3. FIG. 3 is a diagram illustrating the power supply 100 according to some other embodiments of the present disclosure.

Similar to the embodiment of FIG. 1, the power supply 100 shown in FIG. 3 is also used in a three-phase power system, and configured to receive a three-phase input power, and correspondingly output a DC supply voltage Vo.

Compared to the embodiment of FIG. 1, in the present embodiment, each of the power modules Ma, Mb, Mc includes a plurality of power supply units PSU1*a*, PSU2*a*~PSU*na*, PSU1*b*, PSU2*b*~PSU*nb*, and PSU1*c*, PSU2*c*~PSU*nc*.

For example, input terminals of the power supply units PSU1*a*, PSU2*a*~PSU*na* in the same power module Ma are electrically coupled in series, output terminals of the power supply units PSU1*a*, PSU2*a*~PSU*na* in the same power module Ma are electrically coupled in parallel. Each of the power supply units PSU1*a*, PSU2*a*~PSU*na* includes an AC-DC converter 120*a* and a DC-DC converter 140*a*.

Similar to the embodiments mentioned above, the AC-DC converter 120*a* of the supply unit PSU1*a* is configured to convert the corresponding phase input voltage Via of the power supply units PSU1*a* into the intermediate bus voltage Vbus1a. The DC-DC converter 140a of the supply unit PSU1a is configured to output the DC supply voltage Vo according to the intermediate bus voltage Vbus1a. Similarly, the AC-DC converters 120a of the supply units PSU2a~PSUna are respectively configured to convert the corresponding phase input voltages V2a~Vna of the power supply units PSU2a~PSUna into the intermediate bus voltages Vbus2a~Vbusna. The DC-DC converters 140a of the supply units PSU2a~PSUna are configured to output the DC supply voltage Vo according to the intermediate bus voltage Vbus2a~Vbusna.

The control circuit 160 is electrically coupled to the power supply units PSU1a, PSU2a~PSUna, PSU1b, PSU2b~PSUnb, and PSU1c, PSU2c~PSUnc. and configured to output corresponding driving signals to control the AC-DC converters 120a and the DC-DC converters 140a in the power supply units PSU1a, PSU2a~PSUna, PSU1b, PSU2b~PSUnb, and PSU1c, PSU2c~PSUnc.

Figure 4:
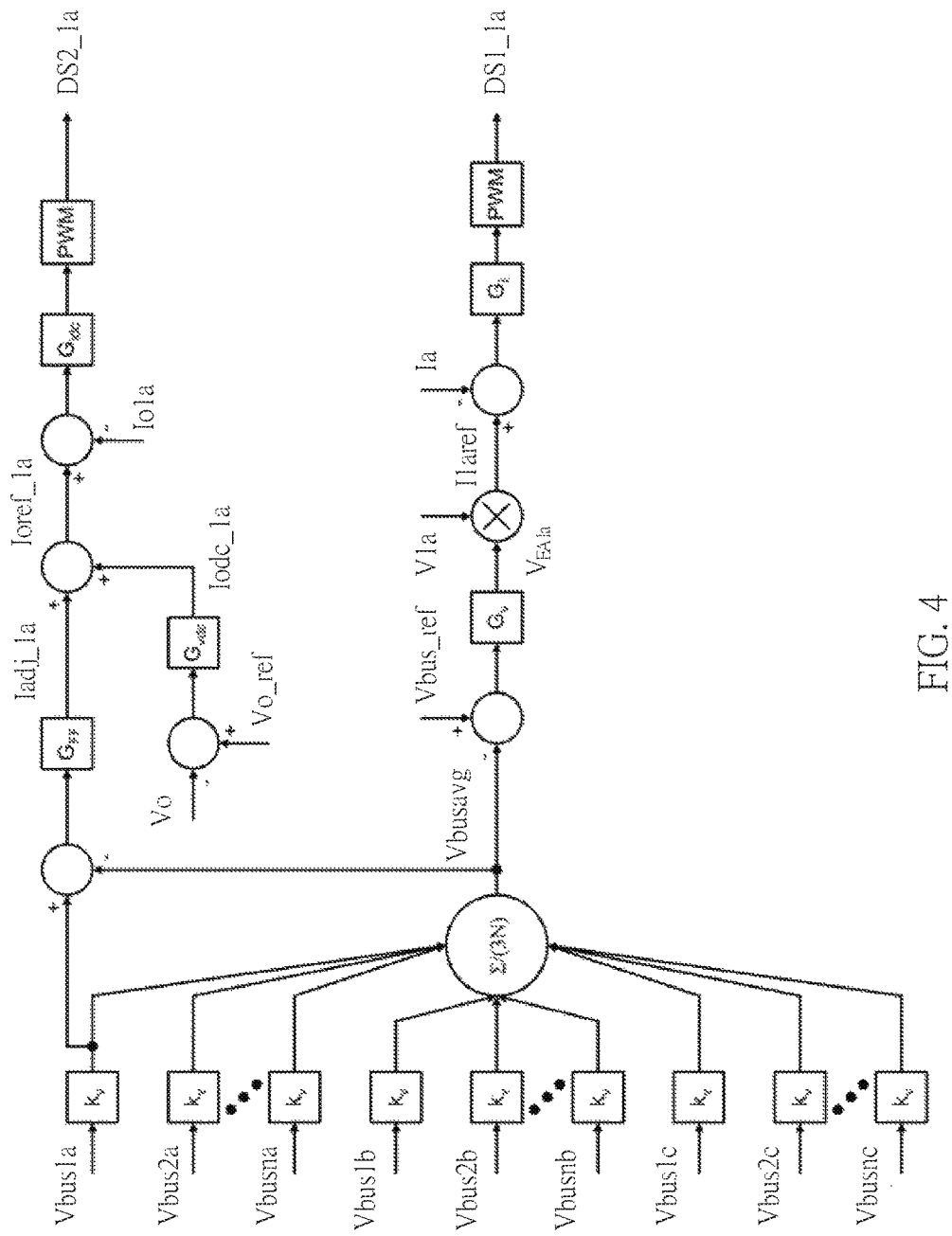
FIG. 4 is a control diagram illustrating the calculation process to obtain the driving signal and the driving signal according to some embodiments of the present disclosure.

Reference is made to FIG. 4. FIG. 4 is a control diagram illustrating the calculation process to obtain the driving signal DS1_1a and the driving signal DS2_1a according to some embodiments of the present disclosure.

The driving signal DS1_1a is configured to control and drive the AC-DC converters 120a in the power supply units PSU1a. The driving signal DS2_1a is configured to control and drive the DC-DC converters 140a in the power supply units PSU1a. Similar to the above embodiments, the bus voltage average value Vbusavg is calculated by the control circuit 160 according to the intermediate bus voltages Vbus1a~Vbusna, Vbus1b~Vbusnb, and Vbus1c~Vbusnc, of the power supply units PSU1a~PSUna, PSU1b~PSUnb, and PSU1c~PSUnc, and the driving signal driving signal DS1_1a for the power supply unit PSU1a is generated according to the bus voltage average value Vbusavg.

For example, the driving signal DS1_1a for the power supply unit PSU1a is generated according to the bus voltage average value Vbusavg, the input voltage V1a of the power supply unit PSU1a, the input current Ia of the power supply unit PSU1a, and the bus voltage reference value Vbusref.

The control circuit 160 is configured to calculate a difference between the bus voltage reference value Vbusref and the bus voltage average value Vbusavg, and amplify the difference by an error amplifier gain Gv to obtain the error amplification signal $V_{EA1a}$, and accordingly calculate the input current reference value I1aref based on the error amplification signal $V_{EA1a}$ and the input voltage V1a of the power supply unit PSU1a.

Next, the control circuit 160 is configured to generate the driving signal DS1_1a according to a difference between the input current reference value I1aref and the input current Ia of the power supply unit PSU1a.

In addition, the driving signal DS2_1a for the power supply unit PSU1a is also generated according to the bus voltage average value Vbusavg.

For example, the driving signal DS2_1a for the corresponding power supply unit PSU1a is generated according to the bus voltage average value Vbusavg, the DC supply voltage Vo, the DC supply voltage reference value Vo_ref, the output current Ioa of the power supply unit PSU1a, and the intermediate voltage Vbus1a of the power supply unit PSU1a.

Specifically, the control circuit 160 is configured to calculate a difference between the intermediate bus voltage Vbus1a of the corresponding power supply unit PSU1a and the bus voltage average value Vbusavg, and amplify the difference by a feed-forward gain Gff to obtain the feed-forward current adjustment signal Iadj_1a, and accordingly sum up the feed-forward current adjustment signal Iadj_1a and the output current reference value Iodc_1a of the corresponding power supply unit PSU1a to calculate the adjusted output current reference value Ioref_1a, so as to generate the driving signal DS2_1a according to the difference between the adjusted output current reference value Ioref_1a and the output current Io1a of the power supply unit PSU1a.

Similar to the embodiments mentioned above, the control circuit 160 is configured to calculate the output current reference value Iodc_1a base on a difference of the DC supply voltage Vo and the DC supply voltage reference value Vo_ref.

Figure 5:
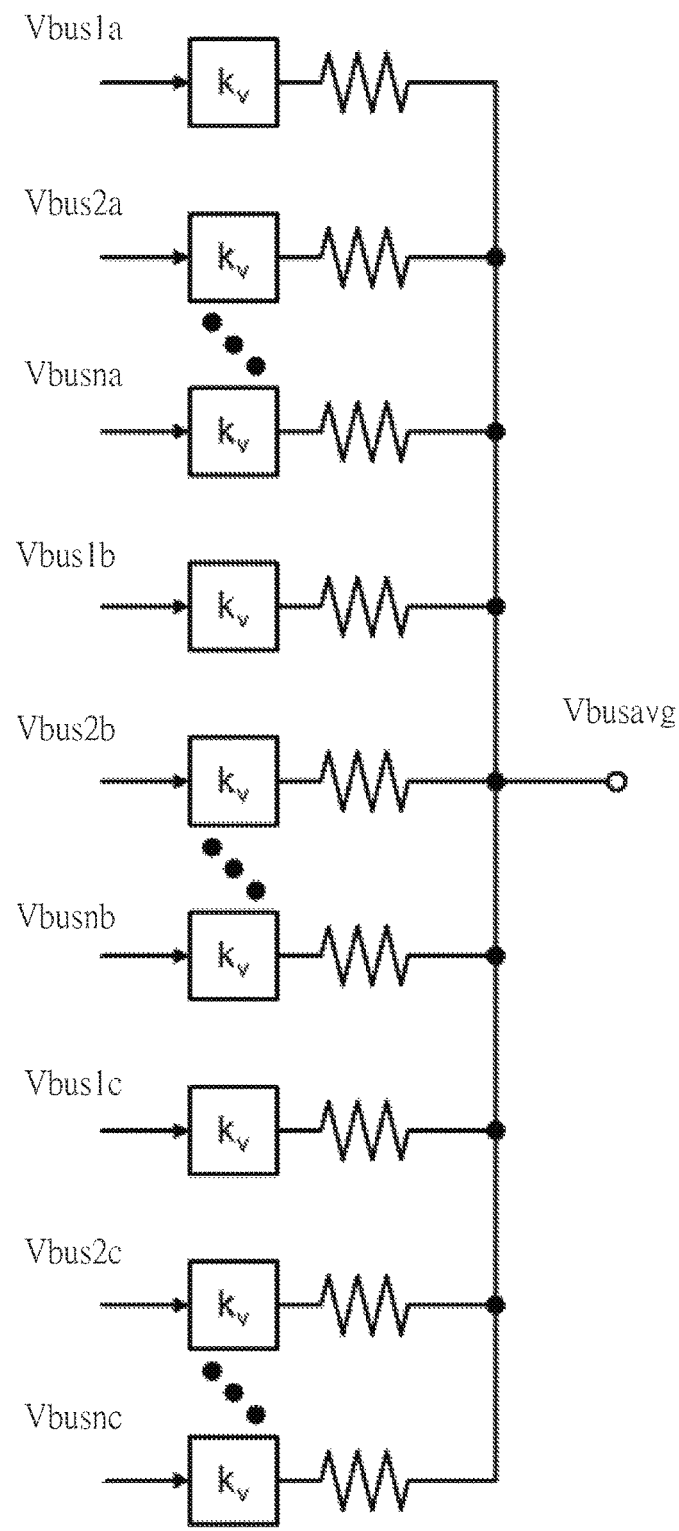
FIG. 5 is a diagram illustrating the implementation of the calculation of the bus voltage average value.

Reference is made to FIG. 5. FIG. 5 is a diagram illustrating the implementation of the calculation of the bus voltage average value Vbusavg.

As depicted in FIG. 5, after multiplied by bus voltage sensing gain Kv respectively, the intermediate bus voltages Vbus1a~Vbusna, Vbusb~Vbusnb, and Vbusc~Vbusnc may be coupled to a common node via corresponding resistor units. Thus, the voltage level of the common node may indicate the bus voltage average value Vbusavg.

Figure 6:
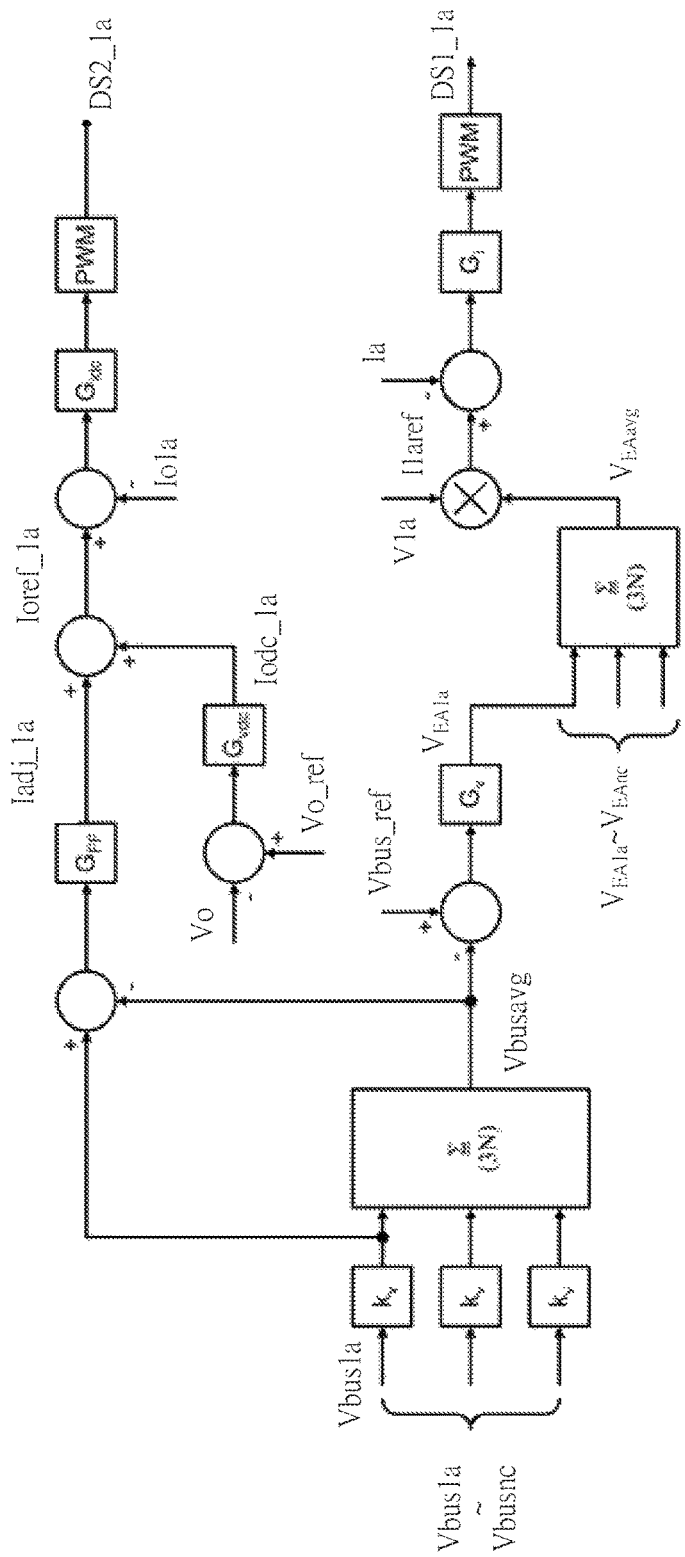
FIG. 6 is a control diagram illustrating the calculation process to obtain the driving signal and the driving signal according to some other embodiments of the present disclosure.

Reference is made to FIG. 6. FIG. 6 is a control diagram illustrating the calculation process to obtain the driving signal DS1_1a and the driving signal DS2_1a according to some other embodiments of the present disclosure.

Compared to the embodiment of FIG. 4, in the present embodiment, the control circuit 160 is further configured to calculate an error amplification signal average value $V_{EAavg}$ according to the error amplification signals $V_{EA1a}$~$V_{EAnc}$ of the power supply units PSU1a~PSUna, PSU1b~PSUnb, and PSU1c~PSUnc.

Next, the control circuit 160 is further configured to accordingly calculate the input current reference value I1aref based on the error amplification signal average value $V_{EAavg}$ and the input voltage V1a of the power supply unit PSU1a, so as to generate the driving signal DS1_1a according to the difference between the input current reference value I1aref and the input current Ia of the power supply unit PSU1a.

Slight difference of the bus voltage reference values Vbusref or error amplifier gains Gv may present in different power supply units and lead to different error amplification signals $V_{EA1a}$~$V_{EAnc}$, causing the different input admittances of the various PSUs and instability of the voltage of the artificial neutral point Ny in analog implementation. Therefore, by including a mismatch compensation for parameter differences and calculating the error amplification signal average value $V_{EAavg}$ to generate the driving signal DS1_1a may overcome the aforementioned issues resulted from the components' mismatch in analog implementation.

It is noted that although the calculation process of the driving signals DS1_1a and DS2_1a for driving the power supply unit PSU1a is mainly discussed above, the calculation process for the driving signals for driving other power supply units is similar thereto and thus further explanations are omitted herein for the sake of brevity.

Those skilled in the art can immediately understand how to perform the operations and functions of the control method based on the power supply 100 in the embodiments described above, and thus a further explanation is omitted herein for the sake of brevity.

The above description includes exemplary operations, but the operations are not necessarily performed in the order described. The order of the operations disclosed in the present disclosure may be changed, or the operations may even be executed simultaneously or partially simultaneously as appropriate, in accordance with the spirit and scope of various embodiments of the present disclosure.

In summary, in the present disclosure, by averaging the voltage outputted by the AC-DC converters in each power modules and power supply units before processing it through the error amplifiers for each phase, the voltage of the artificial neutral point may be properly balanced, and the intermediate bus voltages in each power modules and power supply units may also be controlled.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power supply comprising:
a plurality of power modules, input terminals of the plurality of power modules being electrically connected in star connection, wherein a first input terminal of each power module is connected to a corresponding phase terminal of a multi-phase input voltage source, and a second input terminal of each power module is connected to a second input terminal of another power modules and not connected to a neutral of the multi-phase input voltage source such that each power module is configured to receive receives a corresponding phase input voltage, and output terminals of the plurality of power modules being electrically connected in parallel, wherein each of the plurality of power modules comprises:
a first converter configured to convert the corresponding phase input voltage into an intermediate bus voltage; and
a second converter configured to output a DC supply voltage according to the intermediate bus voltage; and
a control circuit electrically coupled to the plurality of power modules and configured to output a plurality of first driving signals to control the first converters in the plurality of power modules, and configured to output a plurality of second driving signals to control the second converters in the plurality of power modules;
wherein a bus voltage average value is calculated by the control circuit according to the intermediate bus voltages of the plurality of power modules, and the first driving signals and the second driving signals for the plurality of power modules are generated according to the bus voltage average value;
wherein the second driving signal for the corresponding power module is generated according to the bus voltage average value, the DC supply voltage, a DC supply voltage reference value, an output current of the power module, and the intermediate voltage of the power module, and the control circuit is configured to calculate a difference between the intermediate bus voltage of the corresponding power module and the bus voltage average value, and amplify the difference to obtain a feed-forward current adjustment signal, and accordingly sum up the feed-forward current adjustment signal and a first output current reference value of the corresponding power module to calculate a second output current reference value, so as to generate the second driving signal according to a difference between the second output current reference value and the output current of the power module.

2. The power supply of claim 1, wherein the first driving signal for the corresponding power module is generated according to the bus voltage average value, the phase input voltage of the power module, a phase input current of the power module, and a bus voltage reference value.

3. The power supply of claim 2, wherein the control circuit is configured to calculate a difference between the bus voltage reference value and the bus voltage average value and amplify the difference to obtain an error amplification signal, and accordingly calculate an input current reference value based on the error amplification signal and the phase input voltage.

4. The power supply of claim 3, wherein the control circuit is further configured to generate the first driving signal according to a difference between the input current reference value and the phase input current.

5. The power supply of claim 1, wherein the control circuit is configured to calculate the first output current reference value base on a difference of the DC supply voltage and the DC supply voltage reference value.

6. The power supply of claim 1, wherein in the event that an input phase drops out, the bus voltage average value is calculated by the control circuit according to the intermediate bus voltages of the power modules corresponding to remaining input phases.

7. A power supply comprising:
a plurality of power modules, input terminals of the plurality of power modules being electrically connected in star connection, wherein a first input terminal of each power module is connected to a corresponding phase terminal of a multi-phase input voltage source, and a second input terminal of each power module is connected to a second input terminal of another power modules and not connected to a neutral of the multi-phase input voltage source such that each power module is configured to receive receives a corresponding phase input voltage, and output terminals of the plurality of power modules being electrically connected in parallel, wherein each of the power modules comprises a plurality of power supply units, wherein input terminals of the power supply units in the same power module are electrically coupled in series, and output terminals of the power supply units in the same power module are electrically coupled in parallel, and each of the power supply units comprises:
a first converter configured to convert the corresponding phase input voltage into an intermediate bus voltage; and
a second converter configured to output a DC supply voltage according to the intermediate bus voltage; and
a control circuit electrically coupled to the plurality of power supply units and configured to output a plurality of first driving signals to control the first converters in the plurality of power supply units;
wherein a bus voltage average value is calculated by the control circuit according to the intermediate bus voltages of the plurality of power supply units, and the first driving signals for the plurality of power supply units are generated according to the bus voltage average value;
wherein the control circuit is further configured to output a plurality of second driving signals to control the second converters in the plurality of power supply units, and the second driving signals for the plurality of power supply units are generated according to the bus voltage average value, the second driving signal for the corresponding power supply unit is generated according to the bus voltage average value, the DC supply voltage, a DC supply voltage reference value, an output current of the power supply unit, and the intermediate voltage of the power supply unit, and the control circuit is configured to calculate a difference between the intermediate bus voltage of the corresponding power supply unit and the bus voltage average value, and amplify the difference to obtain a feed-forward current adjustment signal, and accordingly sum up the feed-forward current adjustment signal and a first output current reference value of the corresponding power supply unit to calculate a second output current reference value, so as to generate the second driving signal according to a difference between the second output current reference value and the output current of the power supply unit.

8. The power supply of claim 7, wherein the first driving signal for the corresponding power supply unit is generated according to the bus voltage average value, an input voltage of the power supply unit, an input current of the power supply unit, and a bus voltage reference value.

9. The power supply of claim 8, wherein the control circuit is configured to calculate a difference between the bus voltage reference value and the bus voltage average value, amplify the difference to obtain an error amplification signal, and accordingly calculate an input current reference value based on the error amplification signal and the input voltage of the power supply unit, so as to generate the first driving signal according to a difference between the input current reference value and the input current of the power supply unit.

10. The power supply of claim 9, wherein the control circuit is further configured to calculate an error amplification signal average value according to the error amplification signals of the power supply units, and accordingly calculate the input current reference value based on the error amplification signal average value and the input voltage of the power supply unit, so as to generate the first driving signal according to the difference between the input current reference value and the input current of the power supply unit.

11. A power supply control method, comprising:
detecting a plurality of intermediate bus voltages of a plurality of power modules of a power supply respectively, wherein input terminals of the plurality of power modules are connected in star connection, wherein a first input terminal of each power module is connected to a corresponding phase terminal of a multi-phase input voltage source, and a second input terminal of each power module is connected to a second input terminal of another power modules and not connected to a neutral of the multi-phase input voltage source;
calculating, by a control circuit of the power supply, a bus voltage average value according to the intermediate bus voltages of the plurality of power modules;
outputting, by the control circuit, a plurality of first driving signals according to the bus voltage average value to respectively control a plurality of first converters in the plurality of power modules;
outputting, by the control circuit, a plurality of second driving signals according to the bus voltage average value to respectively control a plurality of second converters in the plurality of power modules; and
generating the second driving signal for the corresponding power module according to the bus voltage average value, a DC supply voltage, a DC supply voltage reference value, an output current of the power module, and the intermediate voltage of the power module, wherein generating the second driving signal for the corresponding power module comprises:
calculating a difference between the intermediate bus voltage of the corresponding power module and the bus voltage average value;
amplifying the difference between the intermediate bus voltage of the corresponding power module and the bus voltage average value to obtain a feed-forward current adjustment signal:
calculating a first output current reference value base on a difference between the DC supply voltage reference value and the DC supply voltage;
summing up the feed-forward current adjustment signal and the first output current reference value of the corresponding power module to calculate a second output current reference value accordingly; and
generating the second driving signal according to a difference between the second output current reference value and the output current of the power module.

12. The power supply control method of claim 11, further comprising:
generating, by the control circuit, the first driving signal for the corresponding power module according to the bus voltage average value, a phase input voltage of the power module, a phase input current of the power module, and a bus voltage reference value.

13. The power supply control method of claim 12, wherein generating the first driving signal for the corresponding power module comprises:
calculating a difference between the bus voltage reference value and the bus voltage average value;
amplifying the difference between the bus voltage reference value and the bus voltage average value to obtain an error amplification signal;
calculating an input current reference value based on the error amplification signal and the phase input voltage accordingly; and
generating the first driving signal according to a difference between the input current reference value and the phase input current.

* * * * *